US008103105B2

(12) United States Patent
Kuroda et al.

(10) Patent No.: US 8,103,105 B2
(45) Date of Patent: Jan. 24, 2012

(54) OBJECT DETECTION DEVICE, AND OBJECT DETECTION DEVICE FOR ELEVATOR

(75) Inventors: Shinichi Kuroda, Tokyo (JP); Kazuo Sugimoto, Tokyo (JP); Yoshihisa Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 984 days.

(21) Appl. No.: 11/993,897

(22) PCT Filed: Apr. 26, 2006

(86) PCT No.: PCT/JP2006/308718
§ 371 (c)(1),
(2), (4) Date: Dec. 26, 2007

(87) PCT Pub. No.: WO2007/129374
PCT Pub. Date: Nov. 15, 2007

(65) Prior Publication Data
US 2009/0226092 A1   Sep. 10, 2009

(51) Int. Cl.
*G06K 9/48* (2006.01)
(52) U.S. Cl. ..................................... 382/199
(58) Field of Classification Search .......... 382/192–194, 382/254–275
See application file for complete search history.

(56) References Cited

U.S. PATENT DOCUMENTS

| 6,167,167 | A  | * | 12/2000 | Matsugu et al. | 382/283 |
| 6,339,375 | B1 | * | 1/2002  | Hirata et al.  | 340/541 |
| 6,501,856 | B2 | * | 12/2002 | Kuwano et al.  | 382/194 |
| 2006/0093205 | A1 | * | 5/2006 | Bryll et al.   | 382/152 |

FOREIGN PATENT DOCUMENTS

| JP | 8 69535     | 3/1996  |
| JP | 9 44758     | 2/1997  |
| JP | 9 62842     | 3/1997  |
| JP | 10 313455   | 11/1998 |
| JP | 11 261994   | 9/1999  |
| JP | 2003 324726 | 11/2003 |

* cited by examiner

*Primary Examiner* — Alex Liew
(74) *Attorney, Agent, or Firm* — Oblon, Spivak, McClelland, Maier & Neustadt, L.L.P.

(57) ABSTRACT

In an object detecting apparatus for detecting whether or not a detection object is present in a monitoring area by comparing a present image with a background image photographed when the detection target is not present in the monitoring area, a background contour line information extracting means extracts contour line information of an article photographed in the background image. An object detecting means extracts contour line information other than the contour lines of the background image from the present image. Also, the object detecting means detects whether or not the detection object is present in the monitoring area based upon such a fact as to whether or not the contour line information can be extracted from the present image.

14 Claims, 15 Drawing Sheets

FIG. 4

|  0 | -1 |  0 |
| -1 |  4 | -1 |
|  0 | -1 |  0 |

(a)

| -1 | -1 | -1 |
| -1 |  8 | -1 |
| -1 | -1 | -1 |

(b)

|  1 | -2 |  1 |
|  2 |  4 |  2 |
|  1 | -2 |  1 |

(c)

OBJECT DETECTION DEVICE, AND OBJECT DETECTION DEVICE FOR ELEVATOR

TECHNICAL FIELD

The present invention relates to an object detecting apparatus and an object detecting apparatus for an elevator, which are capable of detecting whether or not a detection target is present in a monitoring area by comparing a present image with a background image photographed by a photographing unit, the background image being photographed when the detection target is not present in the monitoring area.

TECHNICAL BACKGROUND

A conventional apparatus calculates differences of luminance between respective pixels of a background image and respective pixels of a present image, and then, detects whether or not a detection target is present in a monitoring area based upon a total number of pixels which own luminance differences. As a result, in a case where brightness of the monitoring area when the background image is photographed is different from that when the present image is photographed, detecting precision as to the detection target is lowered. Accordingly, in order to avoid that the detecting precision as to the detection target is lowered due to the brightness differences in the conventional object detecting apparatus, brightness of the monitoring area is monitored, and the background image is updated according to the monitored brightness (refer to Patent Document 1).
Patent Document 1: JP 11-261994 A

DISCLOSURE OF THE INVENTION

Problem to be Solved by the Invention

However, in the above-mentioned conventional object detecting apparatus, because sensors, for example, illuminometers for detecting brightness are required, manufacturing cost thereof is increased. Also, no detecting operation can be carried out when background images are updated, so undetectable time periods are produced.

The present invention has been made to solve the above-explained problems, and therefore, has an object to provide an object detecting apparatus and an object detecting apparatus for an elevator, by which manufacturing cost thereof can be suppressed by eliminating a sensor for detecting brightness, and also, an undetectable time period can be eliminated by eliminating an updating operation of a background image.

Means for Solving the Problem

An object detecting apparatus according to the present invention includes: image acquiring means for acquiring both a present image and a background image photographed by a photographing unit, the background image being photographed when a detection target is not present in a monitoring area; background contour line information extracting means for extracting contour line information of the background image; and object detecting means for detecting whether or not a detection target is present in the monitoring area by judging whether or not contour lines other than the contour lines of the background image can be extracted from the present image based upon the contour line information of the background image.

BRIEF DESCRIPTION OF THE DRAWINGS

FIG. 4 An explanatory diagram for representing a Laplacian filter which is utilized by an object detecting means of FIG. 1.

BEST MODE FOR CARRYING OUT THE INVENTION

Referring now to drawings, preferred embodiments of the present invention will be described.

Embodiment 1

Figure 1:
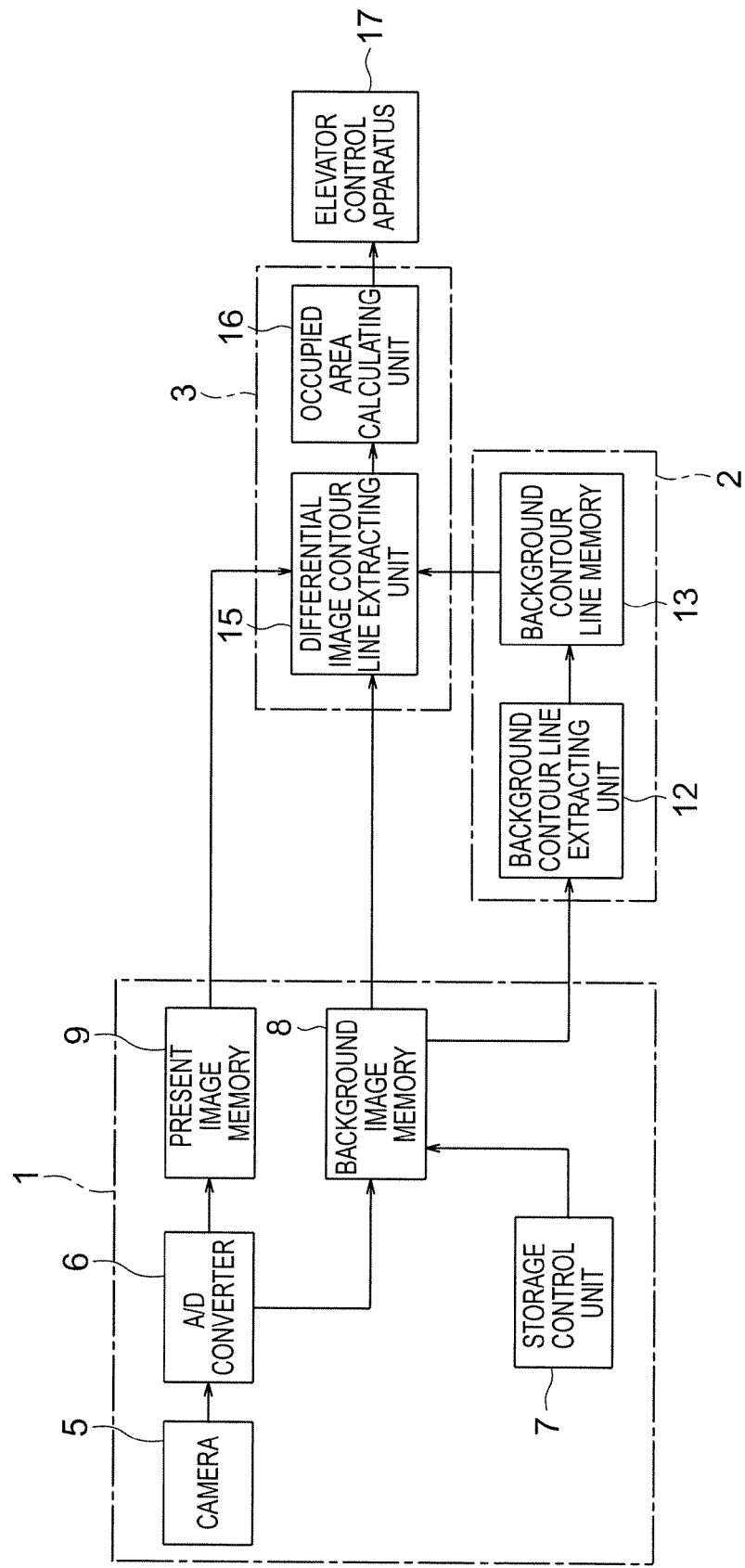
FIG. 1 A structural diagram for indicating an object detecting apparatus for an elevator, according to Embodiment 1 of the present invention.
Figure 4:
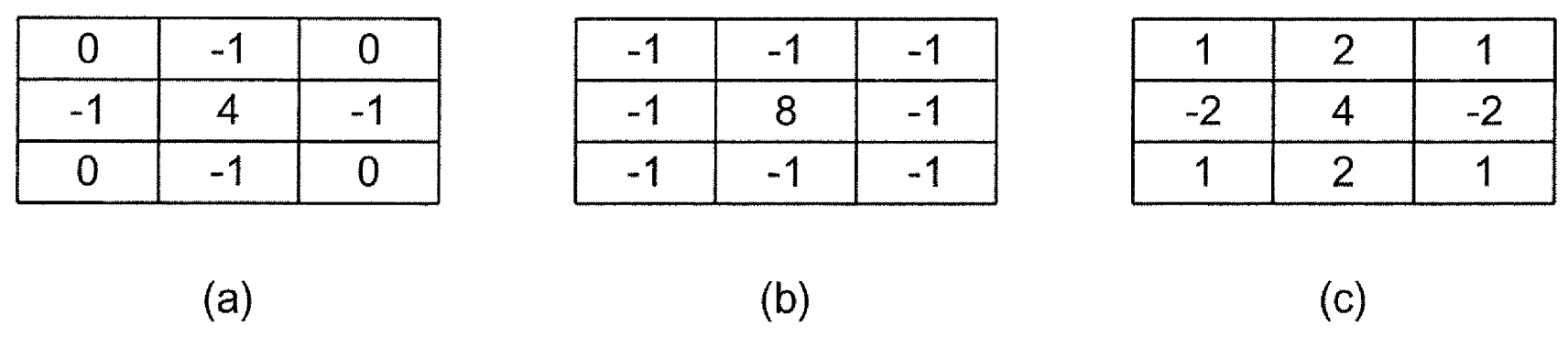

FIG. 1 is a structural diagram for indicating an object detecting apparatus for an elevator, according to Embodiment 1 of the present invention. FIG. 2, FIG. 3, and FIG. 5 to FIG. 7 are explanatory diagrams for explaining image data employed in the object detecting apparatus of FIG. 1. FIG. 4 is an explanatory diagram for representing a Laplacian filter which is utilized by the object detecting apparatus of FIG. 1. In FIG. 1, the object detecting apparatus contains an image acquiring means 1, a background contour line information extracting means 2, and an object detecting means 3. The image acquiring means 1 contains a camera 5 serving as a photographing unit, an A/D converter 6, a storage control unit 7, a background image memory 8, and a present image memory 9. The camera 5 photographs an inside scene of an elevator car, which constitutes a monitoring area. The A/D converter 6 converts an analog image signal outputted from the camera 5 into digital image data. The storage control unit 7 is operated when a building-management person confirms that a detection target, for instance, a passenger and a load is not present within the elevator car. Also, the storage control unit 7 stores image data into the background image memory 8, while the image data has been photographed by the camera 5 when the storage control unit 7 is operated (refer to FIG. 2). The present image memory 9 stores thereinto an image photographed by the camera 5 at a present time (will be referred to as "present image" hereinafter) in a predetermined interval (refer to FIG. 3). In other words, the present image is updated in the predetermined interval. Namely, the image acquiring means 1 acquires both the present image and the background image photographed by the camera 5.

Generally speaking, both information as to colors and information as to luminance (brightness) are contained in all pixels within an image. Luminance of pixels is suddenly changed at positions where contour lines of an object (boundaries of area of object) are located irrespective of brightness of an entire region. Changed values of luminance can be calculated by using differential calculations. As to differential calculations employed in image processing operations, there are a first-order differential calculation using a Sobel filter, and a second-order differential calculation using a Laplacian filter, etc. As to Laplacian filters, there are such a 4-neighborhood Laplacian filter as shown in FIG. 4(a), and an 8-neighborhood Laplacian filter as represented in FIG. 4(b) and FIG. 4(c). The 4-neighborhood Laplacian filter weights luminance "f(x, y)" of a pixel of a predetermined coordinate, and thereafter, calculates a difference "$\Delta(x, y)$" between the weighted luminance and luminance of an adjoining pixel. In other words, the luminance difference of $\Delta(x, y)$ in the case where the 4-neighborhood Laplacian filter is employed may be expressed by the following formula:

$$\Delta(x,y)=4*f(x,y)-\{f(x,y-1)+f(x,y+1)+f(x-1,y)+f(x+1,y)\}$$

The background contour line information extracting means 2 contains a background contour line extracting unit 12 and a background contour line memory 13. The background contour line extracting means 12 extracts contour line information of an article photographed in a background image by employing a 4-neighborhood Laplacian filter and the like (refer to FIG. 5). It should be understood that in FIG. 5, the contour line of the background image is such a portion illustrated in a white color.

To be specific, the background contour line extracting unit 12 calculates $\Delta(x, y)$ in a predetermined pixel of the background image, and also, performs a threshold value processing operation. This threshold value processing operation corresponds to such a process operation that luminance of a predetermined pixel is binary-processed according to a condition as to whether or not the calculated $\Delta(x, y)$ is larger than a first threshold value (hereinafter referred to as "first Th"). In the case where $\Delta(x, y)$ is larger than the first Th, the background contour line extracting unit 12 sets luminance of the relevant pixel to a value of a white color. In the case where $\Delta(x, y)$ is equal to or smaller than the first Th, the background contour line extracting unit 12 sets luminance of the relevant pixel to a value of a black color. Further, the background contour line extracting unit 12 calculates $\Delta(x, y)$ as to all of pixels within the background image, and also, performs threshold value process operations for all of these pixels. The background contour line memory 13 stores thereinto image data indicative of the contour lines of the background image, which are extracted by the background contour line extracting unit 12.

The object detecting means 3 contains a differential image contour line extracting unit 15 and an occupied area calculating unit 16. The differential image contour line extracting unit 15 acquires a differential image which indicates a difference of luminance between each pixel of a present image and each pixel of a background image. Also, the differential image contour line extracting unit 15 extracts contour lines other than the contour lines of a background image based upon contour line information of the background image from the acquired differential image (refer to FIG. 6).

To be specific, the differential image contour line extracting unit 15 calculates $\Delta(x, y)$ at a predetermined pixel of a differential image. Also, the differential image contour line extracting unit 15 judges whether or not a coordinate of the pixel where $\Delta(x, y)$ is calculated corresponds to such a coordinate that the contour line of the background image is located. Further, in the case where the differential image contour line extracting unit 15 judges that the above-mentioned coordinate is not such a coordinate where the contour line of the background image is positioned, the differential image contour line extracting unit 15 binary-processes the luminance of the relevant pixel by employing a second Th. Moreover, in the case where the differential image contour line extracting unit 15 judges that the above-mentioned coordinate is equal to such a coordinate where the contour line of the background image is positioned, the differential image contour line extracting unit 15 binary-processes the luminance of the relevant pixel by employing a third Th larger than the second Th. In other words, contour line detection sensitivity is lowered by increasing a threshold value at the coordinate where the contour line of the background image is positioned. As a result, contour lines other than the contour lines of the background image can be extracted from the differential image. Also, the differential image contour line extracting unit 15 calculates $\Delta(x, y)$ at all of pixels except for an edge of the background image, and also performs a threshold value process operation. In addition, the differential image contour line extracting unit 15 inputs image data of the extracted contour lines into the occupied area calculating unit 16.

Figure 6:
FIG. 6 An explanatory diagram for explaining contour lines of a differential image, which are extracted by a differential image contour line extracting unit of FIG. 1.
Figure 7:
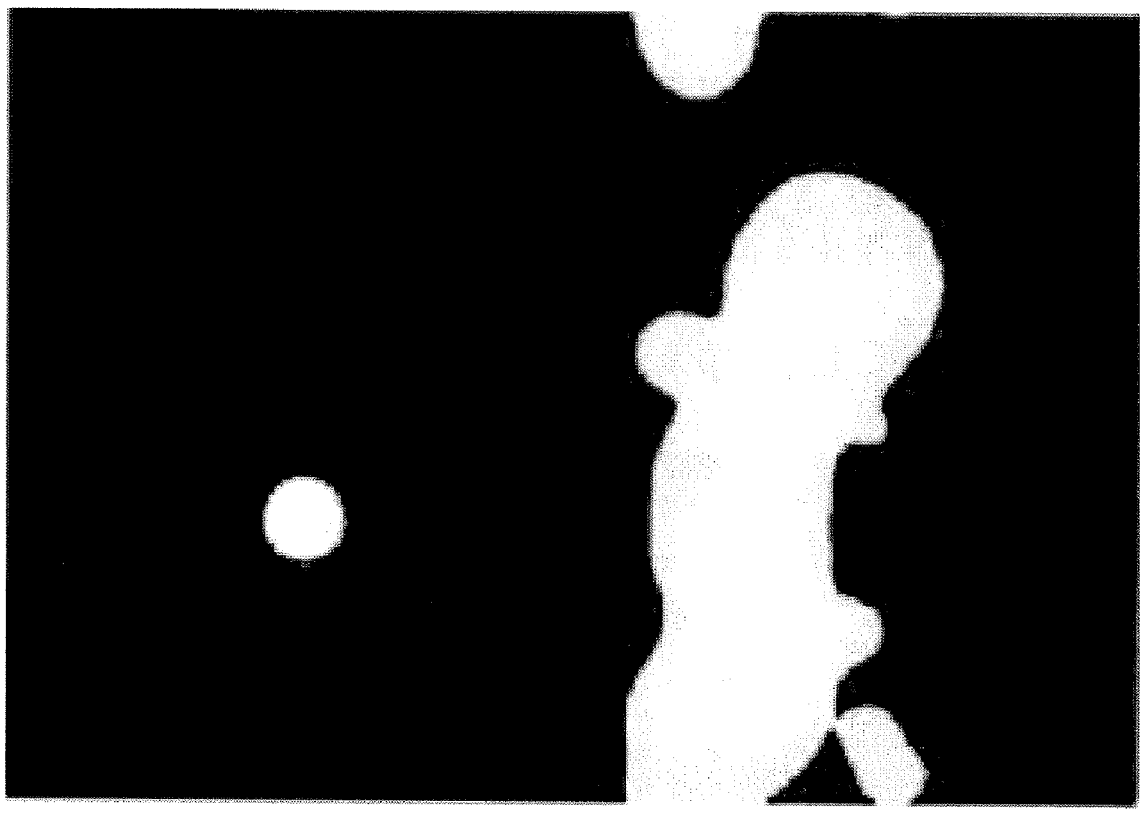
FIG. 7 An explanatory diagram for representing an area of a detection target, which is calculated by an occupied area calculating unit of FIG. 1.

The occupied area calculating unit 16 calculates an area which is occupied by a detection target from the contour lines extracted by the differential image contour line extracting unit 15 (refer to FIG. 7). To be specific, the occupied area calculating unit 16 defines that a peripheral area of the contour line shown in FIG. 6 is such an area which is occupied by the detection target so as to set luminance of this relevant area to a value of a white color, and further defines that an area surrounded by this contour line is the area which is occupied by the detection target so as to set luminance of this relevant area to the value of the white color, so image data shown in FIG. 7 is produced. In other words, the occupied area calculating unit 16 defines that the contour line shown in FIG. 6 and the area near this contour line correspond to the area which is occupied by the detection target. This definition is made based upon such an assumption that the shape of the detection target which enters into the elevator car is complex, and the vicinity area of the contour line has been occupied by the detection target. Further, the occupied area calculating unit 16 counts a total number of pixels whose luminance values are white colors (hereinafter referred to as "COUNT_WHITE"), within a predetermined area covered by a monitoring area. This predetermined area corresponds to a partial area set by the building-management person and an entire monitoring area, for example.

Also, the occupied area calculating unit 16 calculates a ratio of an area occupied by the detection target with respect to a predetermined area (hereinafter referred to "Ratio") based upon the below-mentioned formula:

Ratio=COUNT_WHITE/total pixel number within predetermined area.

Further, the occupied area calculating unit 16 produces such an object detection signal which indicates that a sufficiently large space is left in an elevator car in the case where 0%≦Ratio<20%. Also, the occupied area calculating unit 16 produces such an object detection signal which indicates that some space is left in an elevator car in the case where 20%≦Ratio<50%. In addition, the occupied area calculating unit 16 produces such an object detection signal which indicates a full car status in the case where 50%≦Ratio≦100%. In other words, when 0%≦Ratio<20%, the occupied area calculating unit 16 detects that a detection target is not present in a predetermined area. Also, when 20%≦Ratio, the occupied area calculating unit 16 detects that a detection target is present in a predetermined area. The reason why when 0%≦Ratio<20%, the occupied area calculating unit 16 detects that the detection target is not present in the predetermined area is given as follows. That is, an adverse influence, for instance, a disturbance of an image is suppressed. It should be understood that the above-explained ratios are merely one example.

An elevator control apparatus 17 controls operations of the elevator car in response to an object detection signal derived from the occupied area calculating unit 16. To be specific, the elevator control apparatus 17 invalidates registration of a call from an elevator hall in a case where the object detection signal indicative of the full car status is entered from the occupied area calculating unit 16. It should also be noted that the storage control unit 7, the background contour line extracting unit 12, the differential image contour line extracting unit 15, and the occupied area calculating unit 16 correspond to such a computer equipped with an information storage unit (ROM and RAM) which has stored information such as a program, and a calculation processing unit for executing a calculation process operation based upon the information stored in this information storage unit.

Figure 2:
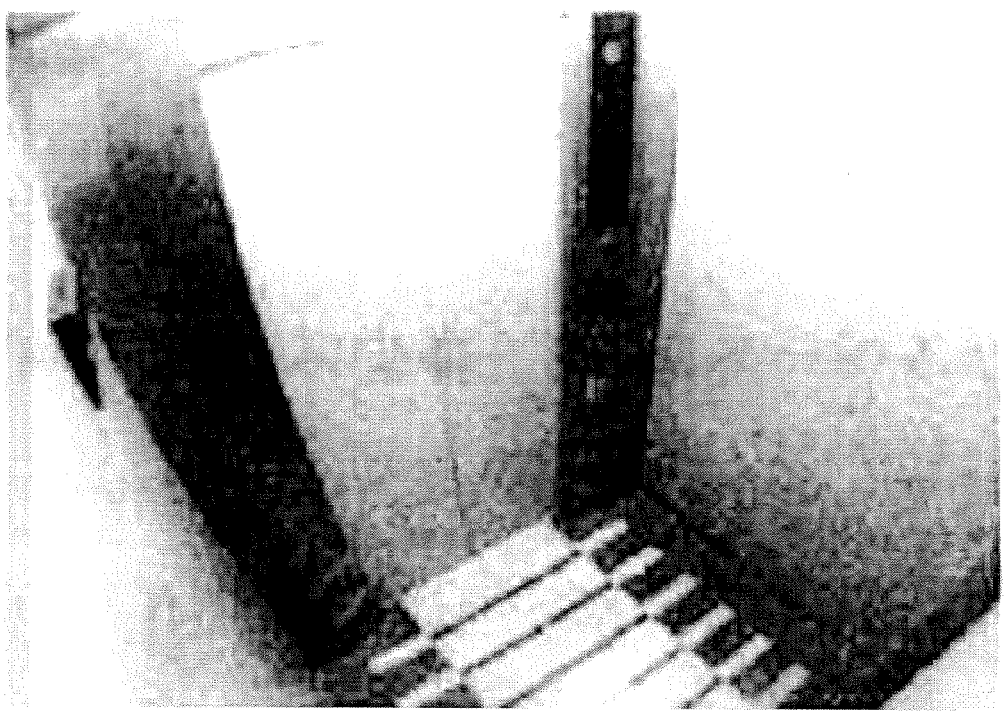
FIG. 2 An explanatory diagram for explaining a background image stored in a background image memory of FIG. 1.
Figure 5:
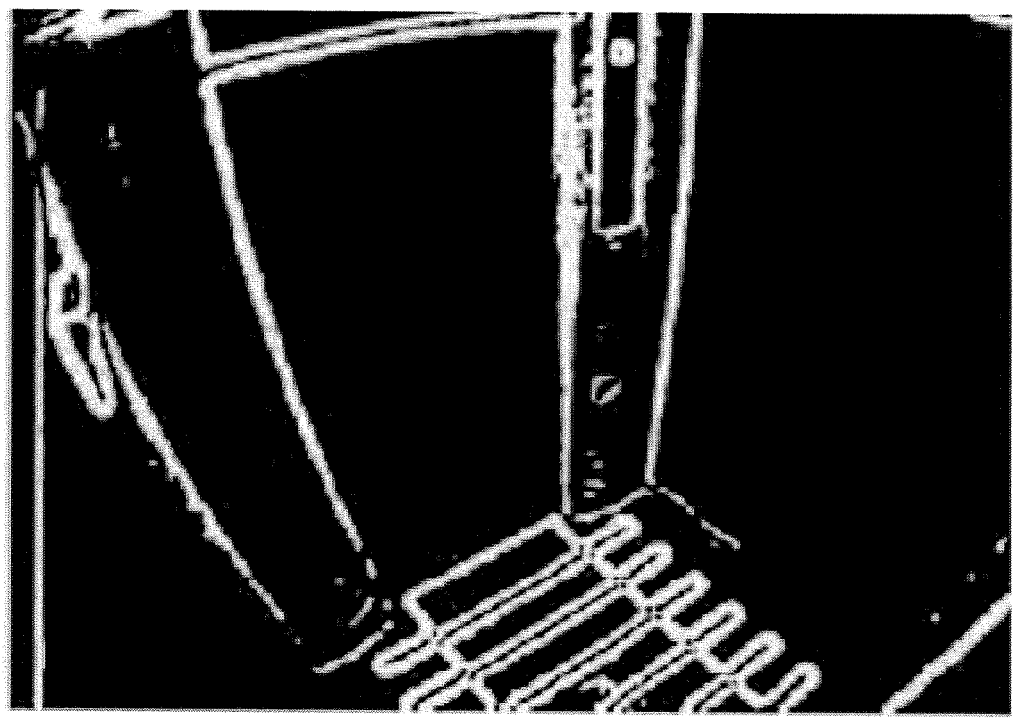
FIG. 5 An explanatory diagram for explaining contour lines of a background image, which are extracted by a background contour line extracting unit of FIG. 1.
Figure 8:
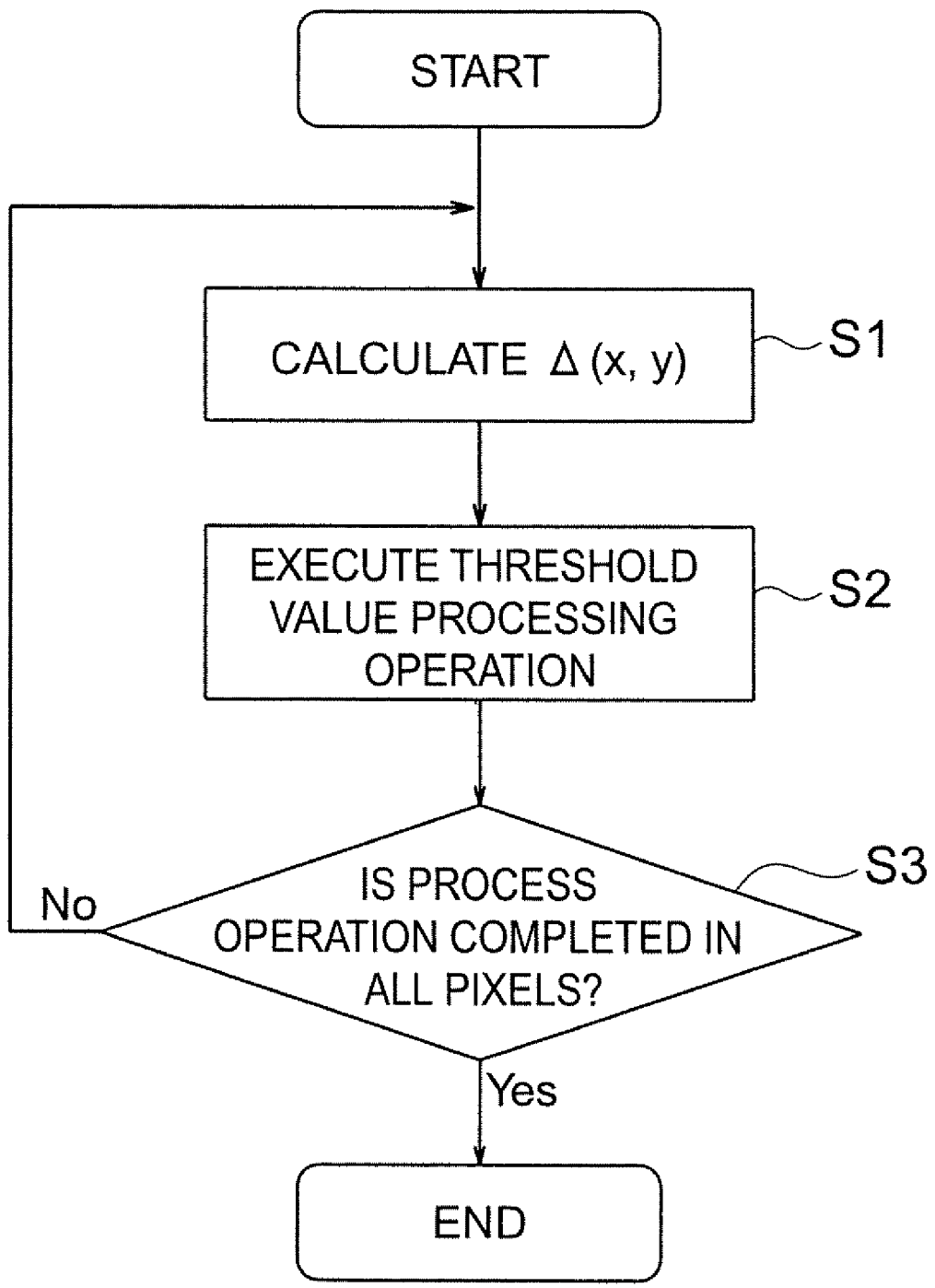
FIG. 8 A flow chart for explaining background contour line extracting operations executed by the background contour line extracting unit of FIG. 1.

Next, a description is made of operations of the object detecting apparatus for the elevator. FIG. 8 is a flow chart for describing background contour line extracting operations executed by the background contour line extracting unit 12 of FIG. 1. In this drawing, for example, when such a background image as shown in FIG. 2 is stored in the background image memory 8, the background contour line extracting unit 12 calculates $\Delta(x, y)$ at a predetermined coordinate of a background image (step S1), judges whether or not this calculated $\Delta(x, y)$ is larger than the first Th, and also, sets the luminance of this coordinate to one of the white color value and the black color value based upon this judgement result (step S2). Subsequently, the background contour line extracting unit 12 judges whether or not a calculation of $\Delta(x, y)$ and a threshold value processing operation are accomplished as to all of pixels of the background image (step S3). When it is judged that both the calculation and the threshold value processing operation are not completed, the background contour line extracting unit 12 performs a calculation of $\Delta(x, y)$ and a threshold value processing operation at another coordinate. When it is judged that both the calculation and the threshold value processing operation are completed, the background contour line extracting unit 12 stores such a background image contour line image data as shown in FIG. 5 into the background contour line memory 13, so this background contour line extracting operation is accomplished.

Figure 3:
FIG. 3 An explanatory diagram for explaining a present image stored in a present image memory of FIG. 1.
Figure 9:
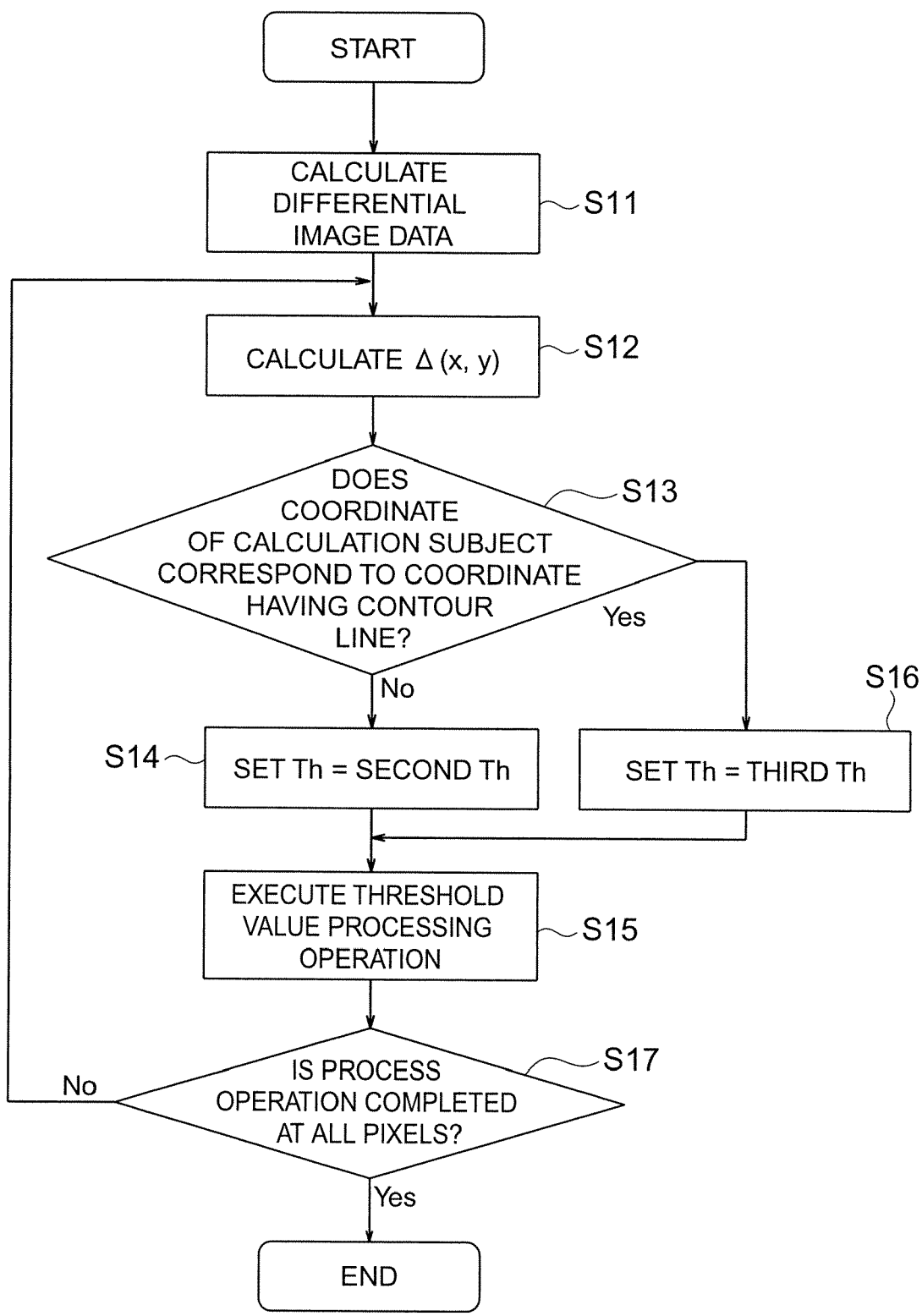
FIG. 9 A flow chart for explaining differential image contour line extracting operations executed by the differential image contour line extracting unit of FIG. 1.

Next, FIG. 9 is a flow chart for explaining differential image contour line extracting operations executed by the differential image contour line extracting unit 15 shown in FIG. 1. In this drawing, for example, when such a present image as shown in FIG. 3 is stored in the present image memory 9, the differential image contour line extracting unit 15 acquires a differential image from the stored present image, and, for example, such an image data as represented in FIG. 2, namely, a background image stored in the background image memory 8 (step S11). Next, the differential image contour line extracting unit 15 calculates $\Delta(x, y)$ at a predetermined coordinate of the differential image (step S12), and also, judges whether or not a coordinate of this pixel corresponds to the coordinate where the contour line of the background image is located based upon, for example, such an image data as represented in FIG. 5, namely, the background image contour line image data stored in the background contour line memory 13 (step S13).

At this time, when it is judged that the coordinate of the above-explained pixel is the coordinate where the contour line of the background image is not positioned, the differential image contour line extracting unit 15 selects the second Th as a threshold value which is used in a threshold value processing operation (step S14), and performs the threshold value processing operation with employment of the second Th (step S15). To the contrary, when it is judged that the coordinate of the above-explained pixel is the coordinate where the contour line of the background image is positioned, the differential image contour line extracting unit 15 selects the third Th larger than the above-mentioned second Th as a threshold value which is used in a threshold value processing operation (step S16), and performs the threshold value processing operation with employment of the third Th. Next, the differential image contour line extracting unit 15 judges whether or not the calculation of $\Delta(x, y)$ and the threshold value processing operation are completed as to all of the pixels of the differential image (step S17). When it is judged that the calculation of $\Delta(x, y)$ and the threshold value processing operation are not completed, the differential image contour line extracting unit 15 performs the calculation of $\Delta(x, y)$ and the threshold value processing operation at other coordinates. When it is judged that the calculation of $\Delta(x, y)$ and the threshold value processing operation are completed, the differential image contour line image data as shown in FIG. 6 is entered to the occupied area calculating unit 16, and this differential image extracting operation is accomplished.

Figure 10:
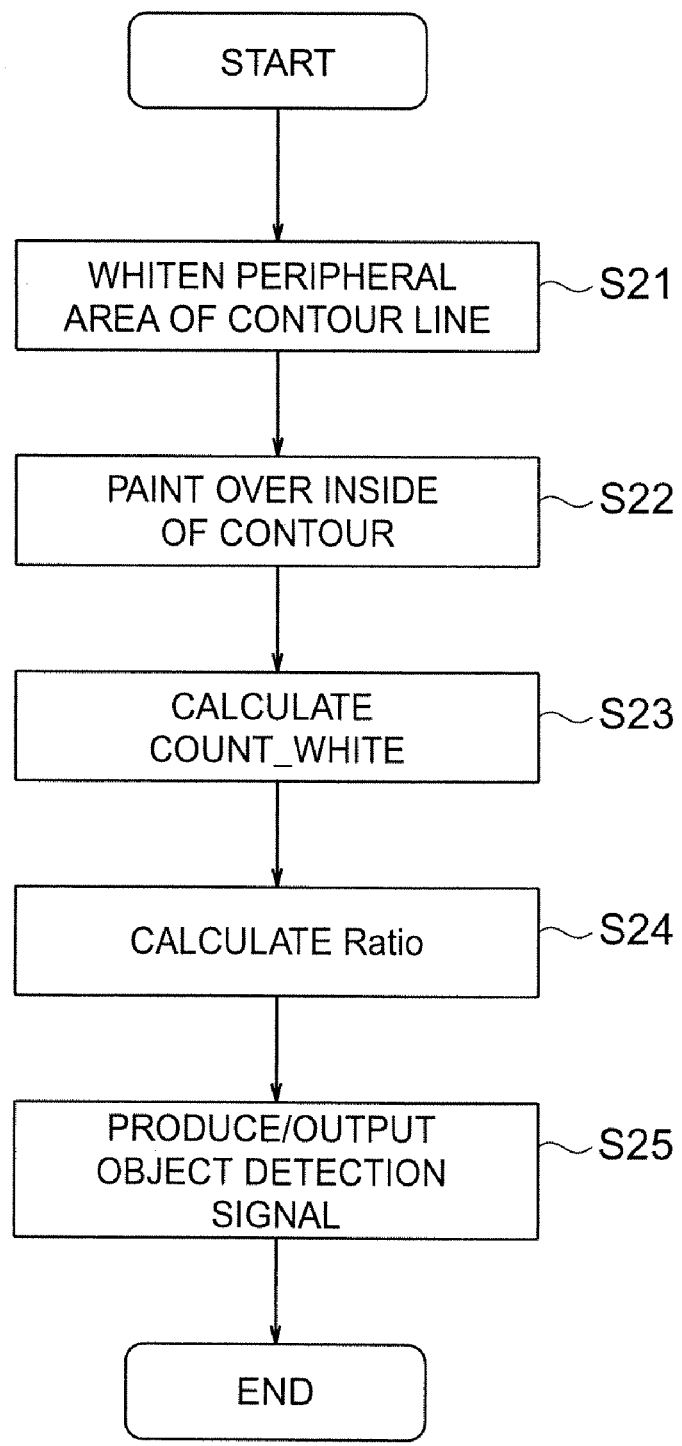
FIG. 10 A flow chart for describing occupied area calculating operations executed by the occupied area calculating unit of FIG. 1.

FIG. 10 is a flow chart for explaining occupied area calculating operations executed by the occupied area calculating unit 16 of FIG. 1. In this drawing, when such a differential image contour line image data as shown in FIG. 6 is entered from the differential image contour line extracting unit 15, the occupied area calculating unit 16 converts a luminance value of a peripheral pixel of this contour line into a white color value (step S21), and converts a luminance value of a pixel as to an area which is surrounded by the extended contour line into a white color value, so such an image data as represented in FIG. 7 is obtained (step S22). Next, the occupied area calculating unit 16 counts COUNT_WHITE (step S23), calculates Ratio (step S24), and produces an object detection signal based upon this calculated Radio value, and also, inputs the produced object detection signal to the elevator control apparatus 17 (step S25).

It should be understood that the above embodiment has explained that the differential image is obtained from both the present image and the background image, and thereafter, the contour lines other than the contour lines of the background image are extracted from the differential image. Alternatively, since the object detecting means 3 of FIG. 1 is replaced by an object detecting means 18 shown in FIG. 11, the contour lines other than the contour lines of the background image may be extracted from the present image. A present image contour line extracting unit 19 of the object detecting means 18 extracts the contour lines other than the contour lines of the background image from the present image in a similar operation to that of the differential image contour line extracting unit 15 shown in FIG. 1 except that the differential image is acquired. In other words, the object detecting means 18 can detect whether or not the detection target is present in the monitoring area by also extracting the contour lines other than the contour lines of the background image from the present image, while the differential image is not acquired.

In such an object detecting apparatus, the object detecting means 3 and 18 can detect whether or not the detection object is present within the monitoring area based upon such a fact as to whether or not the contour lines other than the contour lines of the background image can be extracted from the differential image, or the present image. As a result, the sensor used to detect brightness is no longer required, so the manufacturing cost can be suppressed. Also, the updating operation of the background image is no longer required, so the undetectable time period can be eliminated. In particular, the object detecting means 3 detects whether or not the detection target is present in the monitoring area after the differential image between the present image and the background image has been acquired by checking whether or not the contour lines other than the contour lines of the background image can be extracted from this differential image. As a result, the object detecting means 3 can more firmly reduce such a possibility that the contour line of the background image is extracted as the contour line of the detection target, and can improve the detection precision.

Also, when the object detecting means 3 and 18 extract the contour line at the pixel of the predetermined coordinate of either the differential image or the present image, the object detecting means 3 and 18 judge whether or not the coordinate of this pixel corresponds to such a coordinate where the contour line is located in the background image based upon the contour line information of the background image. When it is judged that the relevant coordinate corresponds to the coordinate where the contour line is located in the background image, the object detecting means 3 and 18 decrease contour line detection sensitivity, and thereafter, extract the contour line at this pixel. As a result, the object detecting means 3 and 18 can more firmly detect the contour lines other than the contour lines of the background image from either the differential image or the present image, and can improve the detection precision of the detection target.

Further, the object detecting means 3 and 18 detect whether or not the detection target is present in the monitoring area, and also, calculate the ratio of the area occupied by the detection target in the predetermined area based upon the extracted contour line. As a result, the object detecting means 3 and 18 can detect not only whether or not the detection target is present, but also how degree the detection target is present, so the detection precision can be improved. In particular, in the case of the conventional elevator apparatus, the judgement is made as to whether or not the passenger space is left in the elevator car based upon the weight loaded in the elevator car. However, for example, in a case where such articles as shopping carts which may occupy a large area within the elevator car although having light weight are present in this elevator car, the conventional elevator apparatus cannot correctly judge whether or not the passenger space is left in this elevator car. To the contrary, in the object detecting apparatus of Embodiment 1, even when such articles are present in the elevator car, the object detecting apparatus can correctly judge whether or not the passenger space is left in the elevator car. In other words, the present invention may especially have a merit with respect to an elevator apparatus.

Moreover, the object detecting means 3 and 18 calculates such a ratio of a total pixel number of an area which is occupied by the detection target within the predetermined area with respect to the entire pixel number of this predetermined area as the pixel of such an area that the extracted contour line and the area near this contour line are occupied by the detection object. As a result, since the ratio of the area occupied by the detection target within the predetermined area is calculated, the object detecting means 3 can more firmly calculate the ratio of the area occupied by the detection target within the monitoring area, and thus, can further improve the detection precision of the detection object.

Embodiment 2

It should be understood that since an arrangement of an object detecting apparatus according to Embodiment 2 is identical to that of the object detecting apparatus according to Embodiment 1 as an entire arrangement, this arrangement will now be explained with reference to FIG. 1. The background contour line extracting unit 12 of Embodiment 2 divides a background image into a plurality of blocks B(i, j) by averaging a plurality of pixels. Also, the background contour line extracting unit 12 calculates luminance change values $\Delta(i, j)$ of the block B(i, j) and performs a threshold value processing operation by employing the first Th to extract a contour line for every block. In other words, the background contour line memory 13 stores thereinto such a image data which is coarser than the image data of the contour line of FIG. 5.

The differential image contour line extracting unit 15 calculates a differential image from, for instance, the image data shown in FIG. 2, namely, the background image stored in the background image memory 8, and also, for example, the image data shown in FIG. 3, namely, the present image stored in the present image memory 9. The differential image contour line extracting unit 15 divides a differential image into a plurality of blocks B(i, j) by averaging a plurality of pixels. Also, the differential image contour line extracting unit 15 calculates luminance change values $\Delta(i, j)$ of the block B(i, j). Further, when the differential image contour line extracting unit 15 extracts a contour line of the differential image in a block of a predetermined coordinate, the differential image contour line extracting unit 15 judges whether or not the coordinate of the block is such a coordinate where the contour line is positioned in the background image. When the differential image contour line extracting unit 15 judges that the coordinate of the block is such a coordinate where the contour line is positioned in the background image, the differential image contour line extracting unit 15 extracts the contour line in the block after contour line detection sensitivity is lowered. In other words, in a case where the value $\Delta(i, j)$ is smaller than either the second Th or the third Th, the differential image contour line extracting unit 15 defines the block as a block having no contour line. Also, in a case where the value Δ(i, j) is larger than either the second Th or the third Th, the differential image contour line extracting unit 15 defines the block as a block having a contour line.

After the differential image contour line extracting unit 15 judges whether or not the contour line is present in each of the blocks, the occupied area calculating unit 16 counts a total number of the blocks (will be referred to as "COUNT_EDGE" hereinafter) in a predetermined area, from which the counter lines could be extracted. Also, the occupied area calculating unit 16 calculates "Ratio", corresponding to a ratio of an area which is occupied by a detection target in the predetermined area, based upon the below-mentioned formula. Other arrangements of Embodiment 2 are similar to those of Embodiment 1.

Ratio=COUNT_EDGE/total number of blocks within predetermined area

Figure 12:
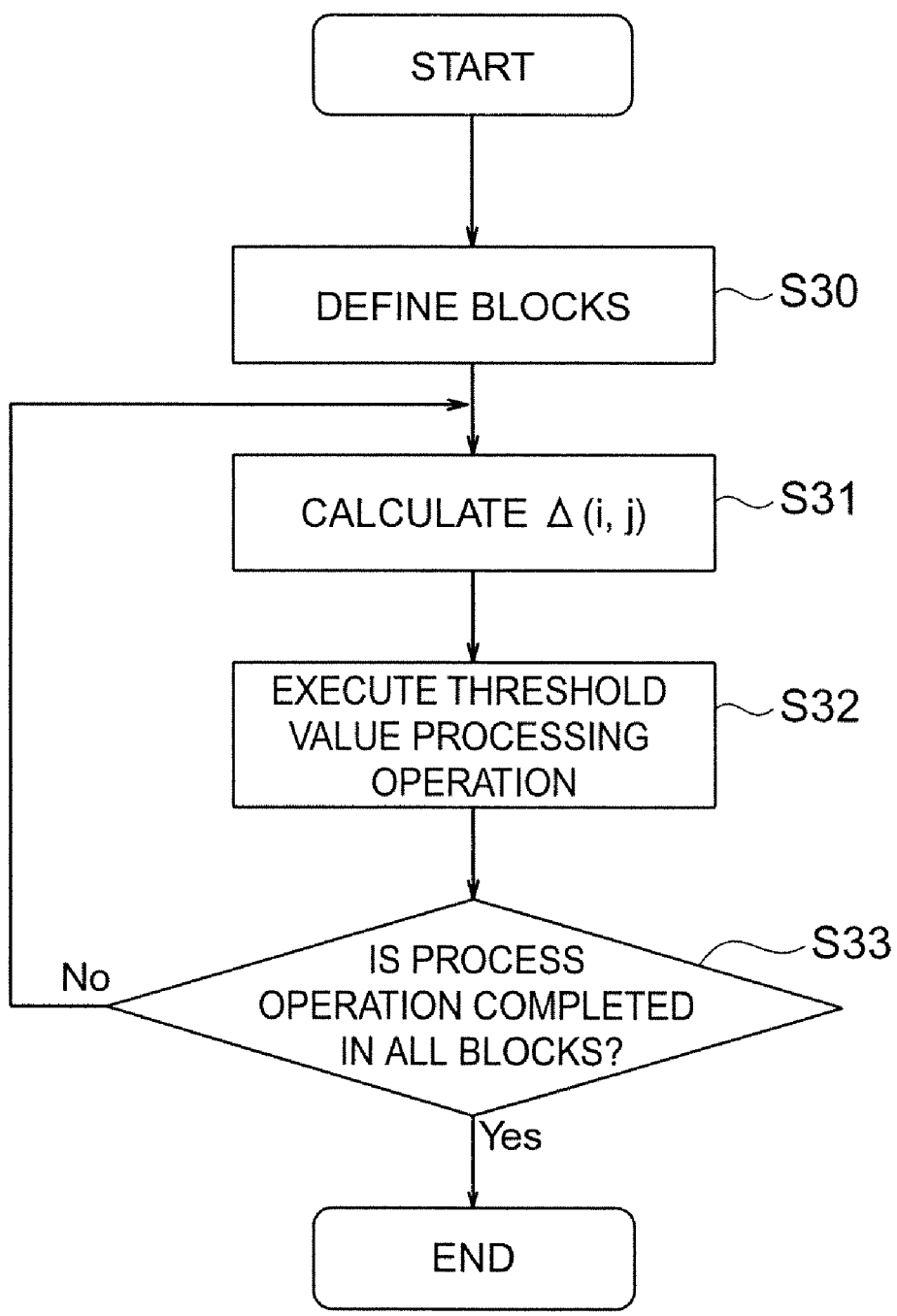
FIG. 12 A flow chart for explaining background contour line extracting operations executed by a background contour line extracting unit of Embodiment 2.

Next, a description is made of operations of the object detecting apparatus for the elevator. FIG. 12 is a flow chart for describing background contour line extracting operations executed by the background contour line extracting unit 12 of Embodiment 2. In this drawing, for example, when such a background image as shown in FIG. 2 is stored in the background image memory 8, the background contour line extracting unit 12 divides the entered background image into a plurality of blocks by averaging a plurality of pixels (step S30), and calculates Δ(i, j) of a predetermined coordinate (step S31), and also judges whether or not the calculated Δ(i, j) is larger than the first Th. Based on this judgement result, luminance of the coordinate is set to any one of the white color and the black color (step S32). Subsequently, the background contour line extracting unit 12 judges whether or not a calculation of Δ(i, j) and a threshold value processing operation are accomplished as to all of the blocks of the background image (step S33). When it is judged that both the calculation and the threshold value processing operation are not completed, the background contour line extracting unit 12 performs a calculation of Δ(i, j) and a threshold value processing operation at another coordinate. When it is judged that both the calculation and the threshold value processing operation are completed, the background contour line extracting unit 12 stores a background image contour line image data which is coarser than that shown in FIG. 5 into the background contour line memory 13, so the background contour line extracting operation is accomplished.

Figure 13:
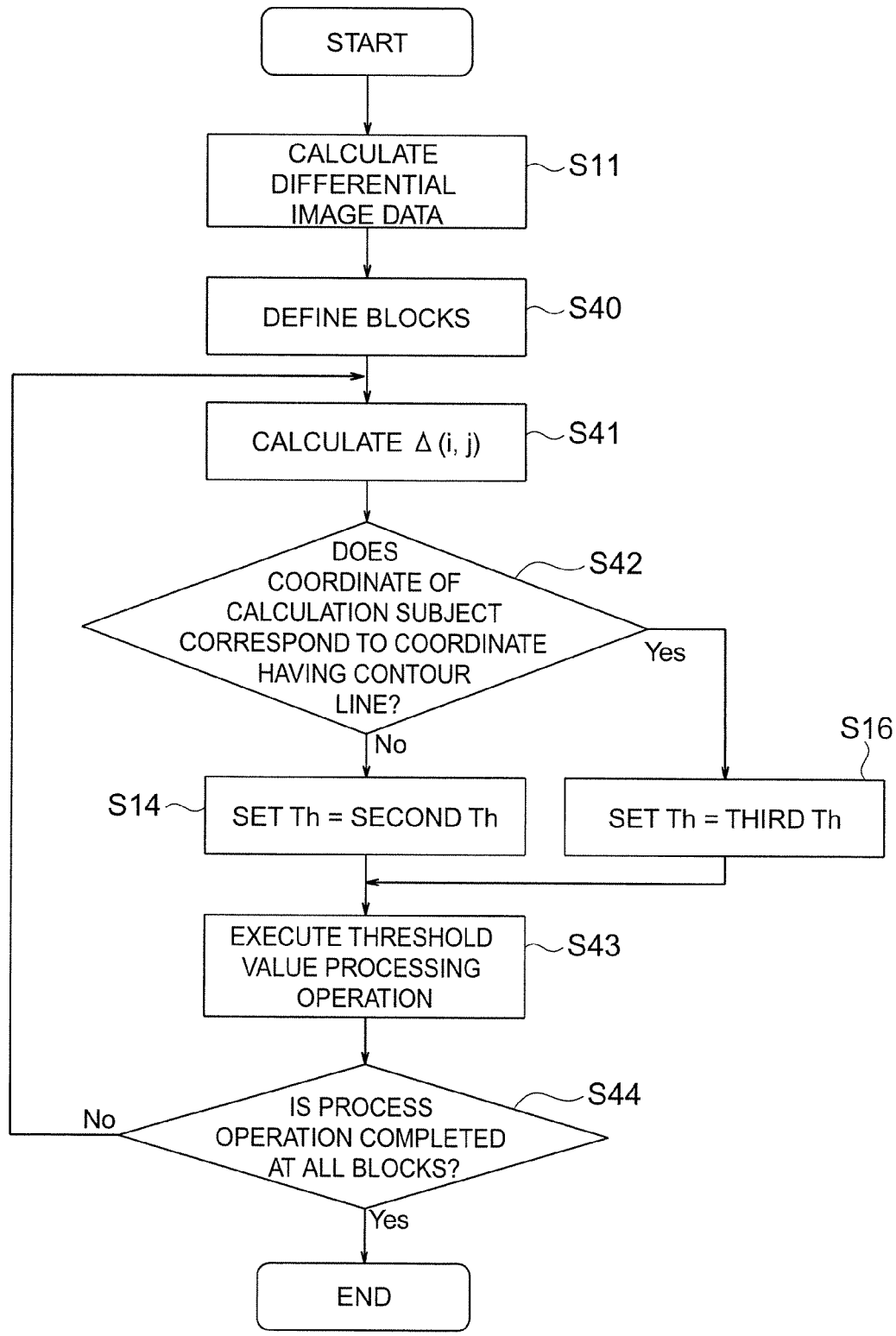
FIG. 13 A flow chart for explaining differential image contour line extracting operations executed by a differential image contour line extracting unit of Embodiment 2.

Next, FIG. 13 is a flowchart for explaining differential image contour line extracting operations executed by the differential image contour line extracting unit 15 of Embodiment 2. In this drawing, for example, when such a present image as shown in FIG. 3 is stored in the present image memory 9, the differential image contour line extracting unit 15 acquires a differential image from the stored present image, and, for example, such a background image as represented in FIG. 2 (step S11). The differential image contour line extracting unit 15 divides the calculated differential image into a plurality of blocks by averaging a plurality of pixels (step S40). Next, the differential image contour line extracting unit 15 calculates Δ(i, j) at a predetermined coordinate of the differential image (step S41), and also, judges whether or not a coordinate of the block corresponds to the coordinate where the contour line of the background image is located based upon the background image contour line image data stored in the background contour line memory 13 (step S42).

At this time, when it is judged that the coordinate of the above-explained block is the coordinate where the contour line of the background image is not positioned, the differential image contour line extracting unit 15 selects the second Th as a threshold value which is used in a threshold value processing operation (step S14), and performs the threshold value processing operation of the block with employment of the second Th (step S43). On the other hand, when it is judged that the coordinate of the above-explained block is the coordinate where the contour line of the background image is positioned, the differential image contour line extracting unit 15 selects the third Th larger than the second Th as a threshold value which is used in a threshold value processing operation (step S16), and performs the threshold value processing operation with employment of the third Th (step S43). Next, the differential image contour line extracting unit 15 judges whether or not the calculation of Δ(i, j) and the threshold value processing operation are completed as to all of the blocks of the differential image (step S44). When it is judged that the calculation of Δ(i, j) and the threshold value processing operation are not completed, the differential image contour line extracting unit 15 performs the calculation of Δ(i, j) and the threshold value processing operation at other coordinates. When it is judged that the calculation of Δ(i, j) and the threshold value processing operation are completed, the differential image contour line image data which is coarser than that shown in FIG. 6 is entered to the occupied area calculating unit 16, and the differential image extracting operation is accomplished.

Figure 14:
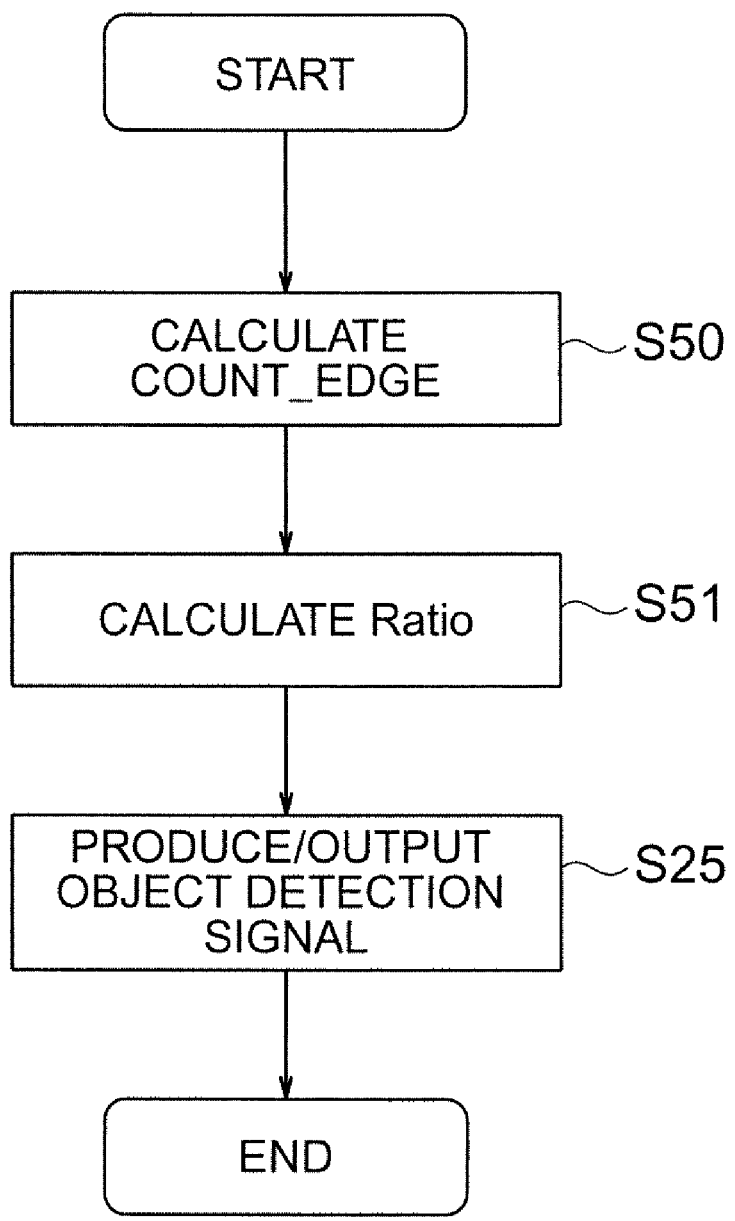
FIG. 14 A flow chart for describing occupied area calculating operations executed by an occupied area calculating unit of Embodiment 2.

FIG. 14 is a flow chart for explaining occupied area calculating operations executed by the occupied area calculating unit 16 of Embodiment 2. In this drawing, when such a differential image contour line image data which is coarser than that shown in FIG. 6 is entered from the differential image contour line extracting unit 15, the occupied area calculating unit 16 counts COUNT_EDGE (step S50), calculates Ratio based upon this COUNT_EDGE (step S51), and produces an object detection signal based upon the calculated Radio value, and also, inputs the produced object detection signal to the elevator control apparatus 17 (step S25).

Figure 11:
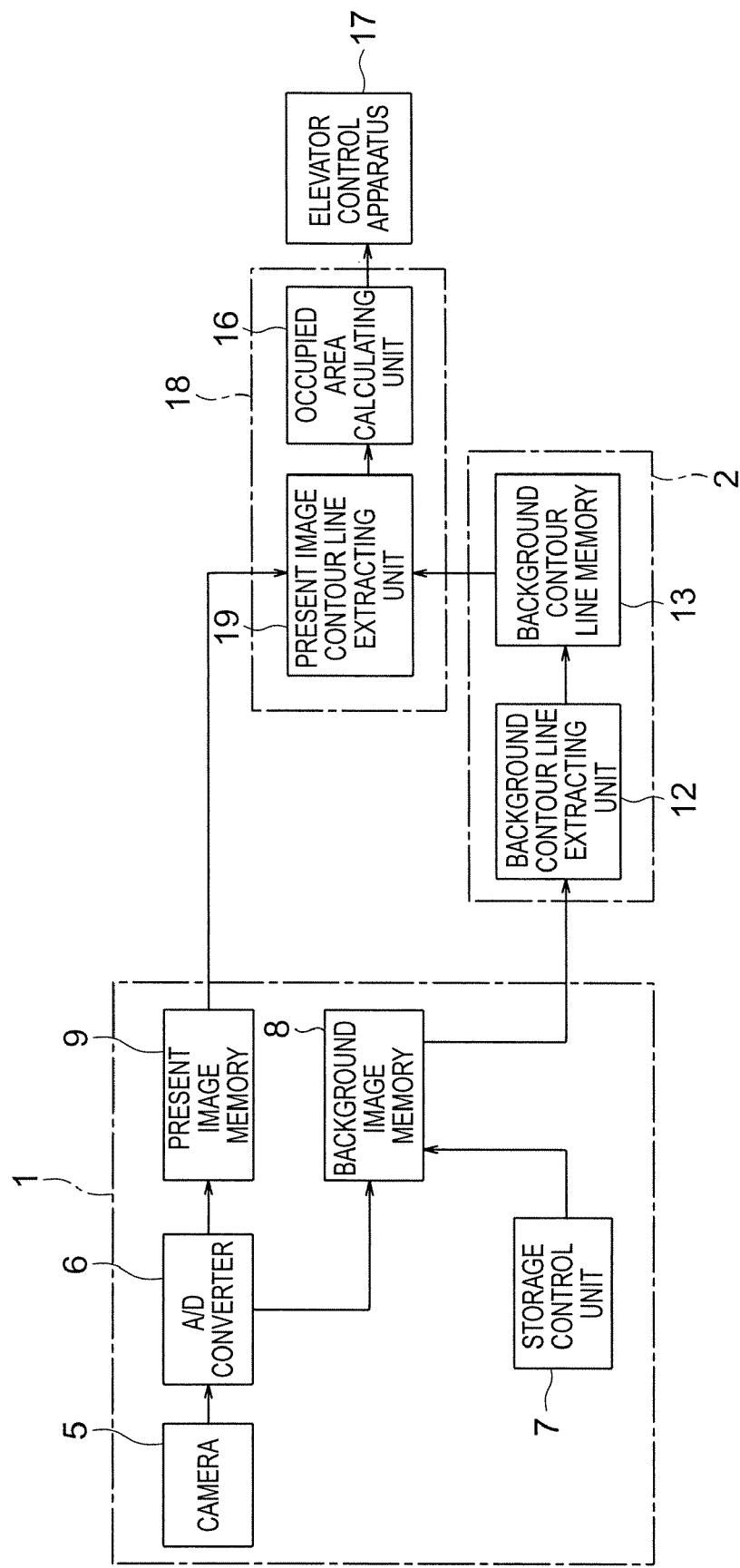
FIG. 11 A structural diagram for representing a modification as to the object detecting apparatus for the elevator of Embodiment 1.

It should be understood that the present image contour line extracting unit 19 of the object detecting means 18 shown in FIG. 11 may extract the contour lines other than the contour lines of the background image from the present image in a similar operation to that of the differential image contour line extracting unit 15 of Embodiment 2 except that the differential image is acquired.

In such the object detecting apparatus, the object detecting means 3 and 18 calculate the luminance change value and perform the threshold value processing operation with respect to each of the blocks where the plural pixels are collected. As a result, the object detecting means 3 and 18 can reduce a total calculation amount, as compared with the calculation amounts required for calculating the luminance change value and performing the threshold value processing operation for every pixel, and also can reduce the calculation loads.

Also, the object detecting means 3 and 18 calculate the ratio of the area which is occupied by the detection target within the predetermined area by counting a total block number from which the contour lines can be extracted in the predetermined area, and also by obtaining the ratio of the total block number from which the contour lines can be extracted with respect to all of these blocks. As a consequence, the calculation amount can be reduced, and the calculation loads can be decreased, as compared with those of a case where the pixels are counted.

Embodiment 3

Figure 15:
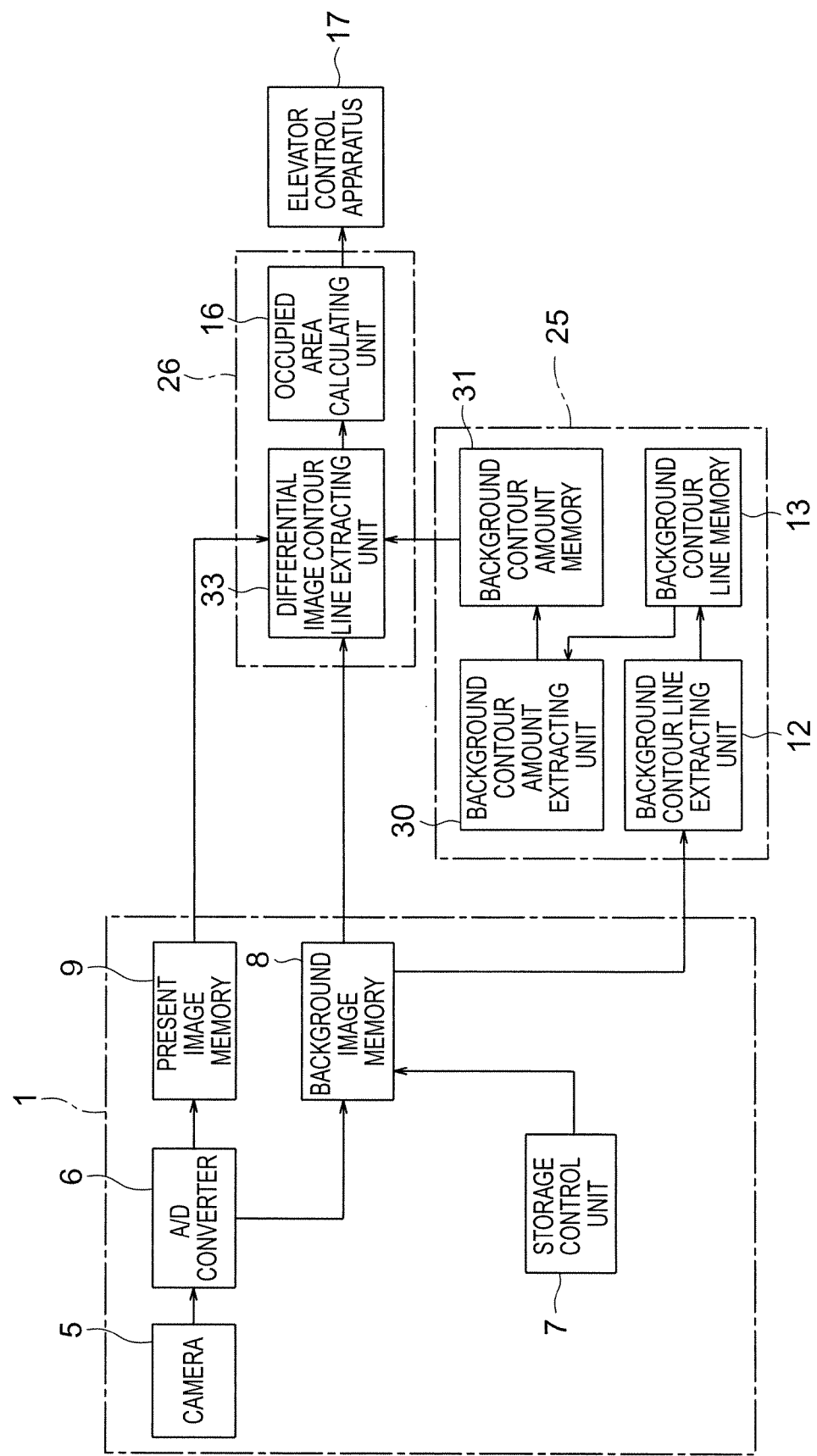
FIG. 15 A structural diagram for indicating an object detecting apparatus for an elevator, according to Embodiment 3 of the present invention.

FIG. 15 is a structural diagram for indicating an object detecting apparatus for an elevator according to Embodiment 3 of the present invention. In this drawing, the object detecting apparatus of Embodiment 3 is provided with background contour line information extracting means 25, and an object detecting means 26. The background contour line information extracting means 25 is provided with a background contour amount calculating unit 30, and a background contour amount memory 31.

Similar to Embodiment 1, the background contour line extracting unit 12 of Embodiment 3 extracts a contour line for every pixel of a background image, and stores such a background image contour line image data as shown in FIG. 5 into the background contour line memory 13. The background contour amount calculating unit 30 acquires the background image contour line image data of the background contour line memory 13, and collects a plurality of pixels to divide a contour image into a plurality of blocks B(i, j). It should be understood that in Embodiment 3, the plural pixels are not averaged. Also, the background contour amount calculating unit 30 calculates a ratio BE(I, j) at which a pixel of a contour line occupies each of these blocks B(i, j). The background contour amount memory 31 stores this ratio BE(i, j).

The object detecting means 26 is provided with a differential image contour line extracting unit 33. The differential image contour line extracting unit 33 collects a plurality of pixels to divide the acquired differential image into a plurality of blocks B(i, j). Also, the differential image contour line extracting unit 33 calculates $\Delta(x, y)$ of each of pixels within the blocks B(i, j). Further, the differential image contour line extracting unit 33 calculates $\Sigma(i, j)$ which is a sum of $\Delta(x, y)$ within the blocks B (i, j), and further, performs a threshold value processing operation by employing a fourth threshold value (hereinafter referred to as "fourth Th") which is expressed by the following formula. Note that symbol "α" indicates a preset constant.

fourth $Th = \alpha * BE(i,j)$

In other words, when the differential image contour line extracting unit 33 extracts a contour line in a block of a predetermined coordinate of a present image, the differential image contour line extracting unit 33 extracts the contour line in this block by employing a contour line detection sensitivity corresponding to an occupation ratio of a contour line in the block of the background image at the same coordinate as this block. In the case where $\Sigma(i, j)$ is equal to or smaller than the fourth Th, the differential image contour line extracting unit 33 defines that this block is a block having no contour line. In the case where $\Sigma(i, j)$ is larger than, the fourth Th, the differential image contour line extracting unit 33 defines that this block is a block having a contour line.

Figure 16:
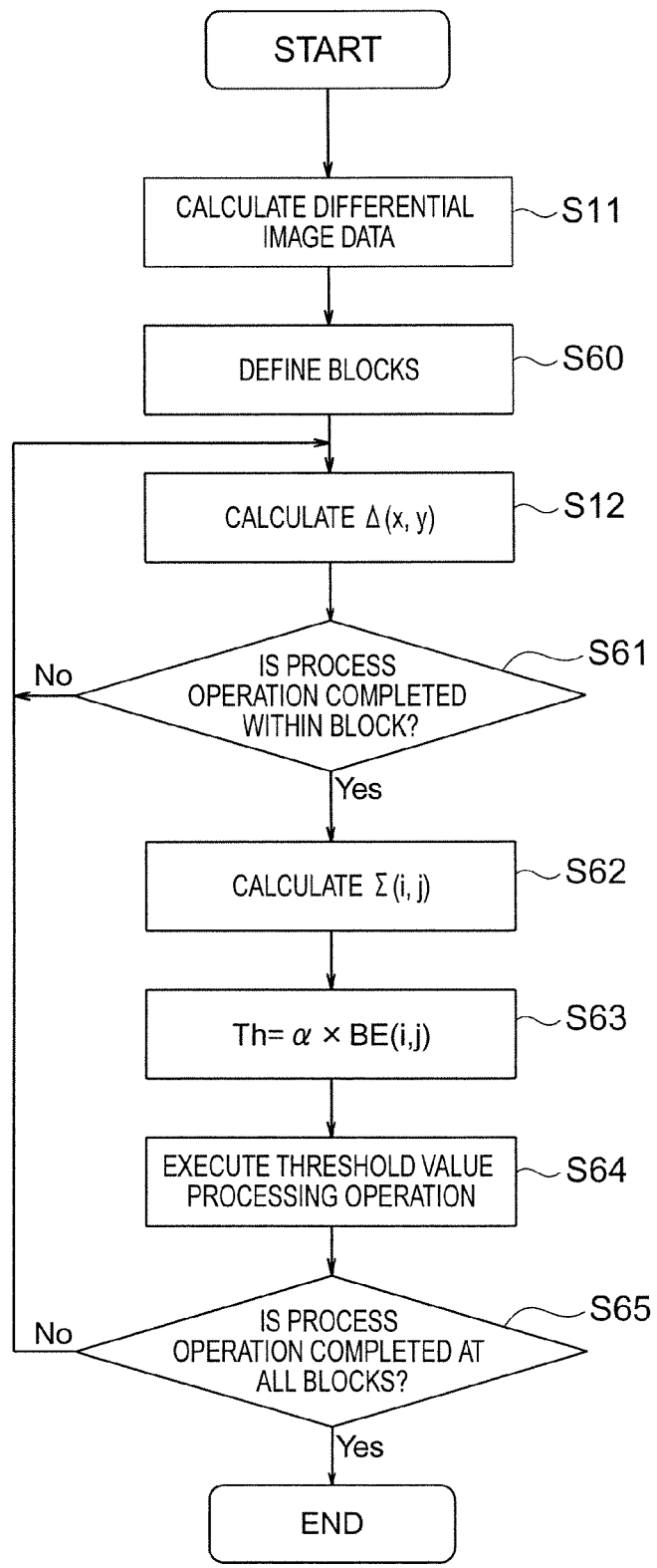
FIG. 16 A flow chart for explaining differential image contour line extracting operations executed by a differential image contour line extracting unit of FIG. 15.

Next, a description is made of operations of the object detecting apparatus for the elevator. FIG. 16 is a flow chart for explaining differential image contour line extracting operations executed by the differential image contour line extracting unit 33 shown in FIG. 15. In this drawing, for example, when such a present image as shown in FIG. 3 is stored in the present image memory 9, the differential image contour line extracting unit 33 acquires a differential image from the stored present image, and, for example, such an image data as represented in FIG. 2, namely, a background image stored in the background image memory 8 (step S11). Next, the differential image contour line extracting unit 33 collects a plurality of pixels so as to divide this differential image into a plurality of blocks (step S60), calculates $\Sigma(x, y)$ of a predetermined coordinate in a block of the predetermined coordinate (step S12), and also, judges whether or not $\Delta(x, y)$ of each pixel is calculated within the block which includes the pixels (step S61). When it is judged that $\Delta(x, y)$ has yet to be calculated in all of the pixels within the block, the differential image contour line extracting unit 33 sequentially calculates $\Delta(x, y)$ until $\Delta(x, y)$ is calculated in all of the pixels.

In contrast, when it is judged that $\Delta(x, y)$ has been calculated in all of the pixels within the block, the differential image contour line extracting unit 33 calculates $\Sigma(i, j)$ based upon the calculated $\Delta(x, y)$ (step S62), determines the fourth Th based upon the coordinate of the block (step S63), and performs a threshold value processing operation (step S64). Next, the differential image contour line extracting unit 33 judges whether or not the threshold value processing operation are completed in all of the blocks (step S65). When it is judged that the threshold value processing operation are not completed, the differential image contour line extracting unit 33 performs the calculation of $\Delta(x, y)$ and the threshold value processing operation in blocks of other coordinates. When it is judged that the calculation of $\Delta(x, y)$ and the threshold value processing operation are completed, the differential image contour line image data which is coarser than that shown in FIG. 6 is entered to the occupied area calculating unit 16, and the differential image extracting operation is accomplished.

Figure 17:
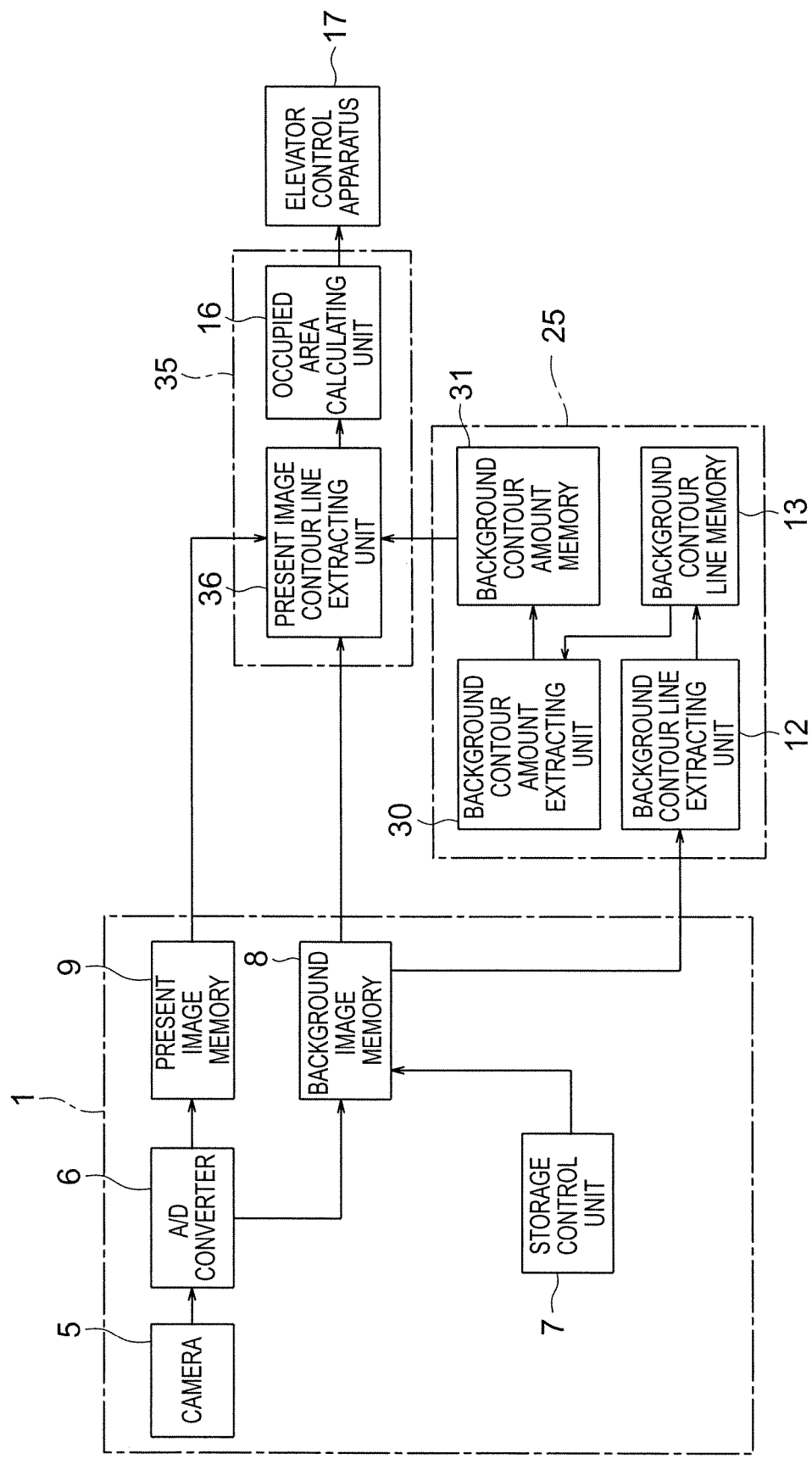
FIG. 17 A structural diagram for representing a modification as to the object detecting apparatus for the elevator of Embodiment 3.

It should also be noted that the present image contour line extracting unit 36 of the object detecting means 35 shown in FIG. 17 may extract the contour lines other than the contour lines of the background image from the present image in a operation similar to that of the differential image contour line extracting unit 33 of Embodiment 3 except that the differential image is acquired.

In such an object detecting apparatus, the background contour line information detecting means 25 calculates the ratio BE(i, j) of the contour line in each of the blocks of the background image; and in extracting the contour line in the block of the predetermined coordinate of either the differential image or the present image, the object detecting means 26 and 35 determine the fourth Th based upon BE(i, j) of the same coordinate as that of the block, and extract the contour line in the block by using the determined fourth Th. As a result, the calculation amount can be reduced, which reduces the calculation load, as compared with those of a case where the threshold value processing operation is carried out for every pixel.

In the above-explained embodiments 1 to 3, it has been explained that the monitoring area is located within the elevator car. Alternatively, for example, an elevator hall may be employed as the monitoring area. In a case where such an object detecting apparatus is provided for monitoring both an inside scene of an elevator car and an elevator hall at each floor, the elevator control apparatus may compare a passenger space of the elevator car with a predicted passenger riding capacity of each floor, to thereby land the elevator car at only such a floor where all of passengers waiting in the elevator hall can ride the elevator car.

The invention claimed is:

1. An object detecting apparatus comprising:
   image acquiring means for acquiring both a present image and a background image photographed by a photographing unit, the background image being photographed when a detection target is not present in a monitoring area;
   background contour line information extracting means for extracting contour line information of the background image; and
   object detecting means for detecting whether or not a detection target is present in the monitoring area by judging whether or not contour lines other than contour lines of the background image can be extracted from the present image based upon the contour line information of the background image, wherein:

when the object detecting means extracts a contour line at a pixel of a predetermined coordinate of the present image, the object detecting means judges whether or not the coordinate of the pixel corresponds to a coordinate at which a contour line is located in the background image based upon the contour line information of the background image; and if the object detecting means judges that the coordinate of the pixel corresponds to the coordinate at which a contour line is located in the background image, the object detecting means lowers a contour line detection sensitivity, and extracts the contour line at the pixel after the contour line detection sensitivity has been lowered.

2. An object detecting apparatus comprising:

image acquiring means for acquiring both a present image and a background image photographed by a photographing unit, the background image being photographed when a detection target is not present in a monitoring area;

background contour line information extracting means for extracting contour line information of the background image; and object detecting means for detecting whether or not a detection target is present in the monitoring area by fudging whether or not contour lines other than contour lines of the background image can be extracted from the present image based upon the contour line information of the background image, wherein:

the background contour line information extracting means divides the background image into a plurality of blocks by averaging a plurality of pixels, and thereafter, extracts contour line information of the background image;

the object detecting means divides the present image into a plurality of blocks by averaging a plurality of pixels along with judging whether or not the coordinate of the block corresponds to a coordinate at which a contour line is located in the background image based upon the contour line information of the background image when extracting a contour line at a block of a predetermined coordinate of the present image; and if the object detecting means judges that the coordinate of the block corresponds to the coordinate at which a contour line is located in the background image, the object detecting means lowers a contour line detection sensitivity, and extracts the contour line at the block after the contour line detection sensitivity has been lowered.

3. An object detecting apparatus comprising:

image acquiring means for acquiring both a present image and a background image photographed by a photographing unit, the background image being photographed when a detection target is not present in a monitoring area;

background contour line information extracting means for extracting contour line information of the background image; and object detecting means for detecting whether or not a detection target is present in the monitoring area by judging whether or not contour lines other than contour lines of the background image can be extracted from the present image based upon the contour line information of the background image, wherein:

the background contour line information extracting means divides the background image into a plurality of blocks by collecting a plurality of pixels, and calculates a ratio of contour lines which occupy each of the blocks;

the object detecting means divides the background image into a plurality of blocks by collecting a plurality of pixels along with determining contour line detection sensitivity based upon a ratio of contour lines which occupy a block of the background image at the same coordinate of the block when extracting a contour line in a block of a predetermined coordinate of the present image, and judges whether or not the contour line can be extracted in the block by employing the determined contour line detection sensitivity.

4. The object detecting apparatus according to claim 1, wherein the object detecting means detects whether or not the detection target is present in the monitoring area, and calculates a ratio of an area which is occupied by the detection target in a predetermined area contained in the monitoring area based upon the extracted contour lines.

5. The object detecting apparatus according to claim 4, wherein the object detecting means calculates the ratio of the area occupied by the detection target in the predetermined area by calculating a ratio of a total pixel number occupied by the detection target within the predetermined area with respect to all of the pixels of the predetermined area as pixels of an area where the extracted contour lines and an area near the contour lines are occupied by the detection object.

6. The object detecting apparatus according to claim 4, wherein the object detecting means divides the present image into a plurality of blocks, and counts the total number of blocks in the predetermined area, from which contour lines other than the contour lines of the background image could be extracted, and calculates a ratio of the block number at which the contour lines could be extracted with respect to all of the block numbers of the predetermined area so as to calculate a ratio of an area which is occupied by the detection object in the predetermined area.

7. The object detecting apparatus according to claim 1, wherein after the object detecting means acquires a differential image between the present image and the background image, the object detecting means detects whether or not the detection target is present in the monitoring area by judging whether or not the contour lines other than the contour lines of the background image can be extracted from the differential image based upon the contour line information of the background image.

8. An object detecting apparatus for an elevator comprising:

image acquiring means for acquiring both a present image and a background image photographed by a photographing unit that photographs an inner scene of an elevator car, the background image being photographed when a detection target is not present in the elevator car;

background contour line information extracting means for extracting contour line information of the background image; and object detecting means for detecting whether or not a detection target is present in the elevator car by judging whether or not contour lines other than contour lines of the background image can be extracted from the present image based upon the contour line information of the background image, wherein:

when the object detecting means extracts a contour line at a pixel of a predetermined coordinate of the present image, the object detecting means judges whether or not the coordinate of the pixel corresponds to a coordinate at which a contour line is located in the background image based upon the contour line information of the background image; and if the object detecting means judges that the coordinate of the pixel corresponds to the coordinate at which a contour line is located in the background image, the object detecting means lowers a contour line detection sensitivity, and extracts the contour line at the pixel after the contour line detection sensitivity has been lowered.

9. An object detecting apparatus for an elevator comprising:
  image acquiring means for acquiring both a present image and a background image photographed by a photographing unit that photographs an inner scene of an elevator car, the background image being photographed when a detection target is not present in the elevator car;
  background contour line information extracting means for extracting contour line information of the background image; and
  object detecting means for detecting whether or not a detection target is present in the elevator car by judging whether or not contour lines other than contour lines of the background image can be extracted from the present image based upon the contour line information of the background image, wherein:
  the background contour line information extracting means divides the background image into a plurality of blocks by averaging a plurality of pixels, and thereafter, extracts contour line information of the background image;
  the object detecting means divides the present image into a plurality of blocks by averaging a plurality of pixels along with judging whether or not the coordinate of the block corresponds to a coordinate at which a contour line is located in the background image based upon the contour line information of the background image when extracting a contour line at a block of a predetermined coordinate of the present image; and
  if the object detecting means judges that the coordinate of the block corresponds to the coordinate at which a contour line is located in the background image, the object detecting means lowers a contour line detection sensitivity, and extracts the contour line at the block after the contour line detection sensitivity has been lowered.

10. An object detecting apparatus for an elevator comprising:
  image acquiring means for acquiring both a present image and a background image photographed by a photographing unit that photographs an inner scene of an elevator car, the background image being photographed when a detection target is not present in the elevator car;
  background contour line information extracting means for extracting contour line information of the background image; and
  object detecting means for detecting whether or not a detection target is present in the elevator car by judging whether or not contour lines other than contour lines of the background image can be extracted from the present image based upon the contour line information of the background image, wherein:
  the background contour line information extracting means divides the background image into a plurality of blocks by collecting a plurality of pixels, and calculates a ratio of contour lines which occupy each of the blocks;
  the object detecting means divides the background image into a plurality of blocks by collecting a plurality of pixels along with determining contour line detection sensitivity based upon a ratio of contour lines which occupy a block of the background image at the same coordinate of the block when extracting a contour line in a block of a predetermined coordinate of the present image, and judges whether or not the contour line can be extracted in the block by employing the determined contour line detection sensitivity.

11. The object detecting apparatus for an elevator according to claim 8, wherein the object detecting means detects whether or not the detection target is present in the elevator car, and calculates a ratio of an area which is occupied by the detection target in a predetermined area contained in the elevator car based upon the extracted contour lines.

12. The object detecting apparatus for an elevator according to claim 11, wherein the object detecting means calculates the ratio of the area occupied by the detection target in the predetermined area by calculating a ratio of a total pixel number occupied by the detection target within the predetermined area with respect to all of the pixels of the predetermined area as pixels of an area where the extracted contour lines and an area near the contour lines are occupied by the detection object.

13. The object detecting apparatus for an elevator according to claim 11, wherein the object detecting means divides the present image into a plurality of blocks, and counts the total number of blocks in the predetermined area, from which contour lines other than the contour lines of the background image could be extracted, and calculates a ratio of the block number at which the contour lines could be extracted with respect to all of the block numbers of the predetermined area so as to calculate a ratio of an area which is occupied by the detection object in the predetermined area.

14. The object detecting apparatus for an elevator according to claim 8, wherein after the object detecting means acquires a differential image between the present image and the background image, the object detecting means detects whether or not the detection target is present in the elevator car by judging whether or not the contour lines other than the contour lines of the background image can be extracted from the differential image based upon the contour line information of the background image.

* * * * *